(No Model.)  4 Sheets—Sheet 1.

G. F. SIMONDS.
BALL BEARING.

No. 501,375.  Patented July 11, 1893.

Witnesses.
Robert Everitt
J. Fred. Kelley

Inventor.
George F. Simonds.
By James L. Norris
Atty.

(No Model.)

4 Sheets—Sheet 2.

G. F. SIMONDS.
BALL BEARING.

No. 501,375. Patented July 11, 1893.

Witnesses.
Robert Emmett.
J. Fred. Kelley.

Inventor:
George F. Simonds.
By James L. Norris.
Atty.

(No Model.)  4 Sheets—Sheet 4.

G. F. SIMONDS.
BALL BEARING.

No. 501,375.  Patented July 11, 1893.

Witnesses.
Chat Brudt,
J. Fred. Kelley.

Inventor:
George F. Simonds.
By James L. Norris.
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 501,375, dated July 11, 1893.

Application filed November 18, 1892. Serial No. 452,449. (No model.)

*To all whom it may concern:*

Be it known that I, GEORGE F. SIMONDS, a citizen of the United States, residing at Fitchburg, in the county of Worcester and State of Massachusetts, have invented new and useful Improvements in Ball-Bearings, of which the following is a specification.

This invention relates to ball bearings comprising one or more annular series or groups of spherical rollers or balls arranged to bear against and roll in contact with concentric bearing surfaces for the purpose of supporting the radial pressure of a rotary shaft or axle, or a wheel or other part adapted to rotate on a fixed shaft or axle, and other spherical rollers or balls arranged in annular series to bear against and roll in contact with parallel plane surfaces for the purpose of resisting end pressure or thrust.

The object of my present invention is to provide an improved anti-friction ball bearing for railway car axles, vehicle wheels and similar rotary bodies; and the invention consists in the peculiar features of construction and novel combinations of devices hereinafter particularly described and claimed.

Figure 1:
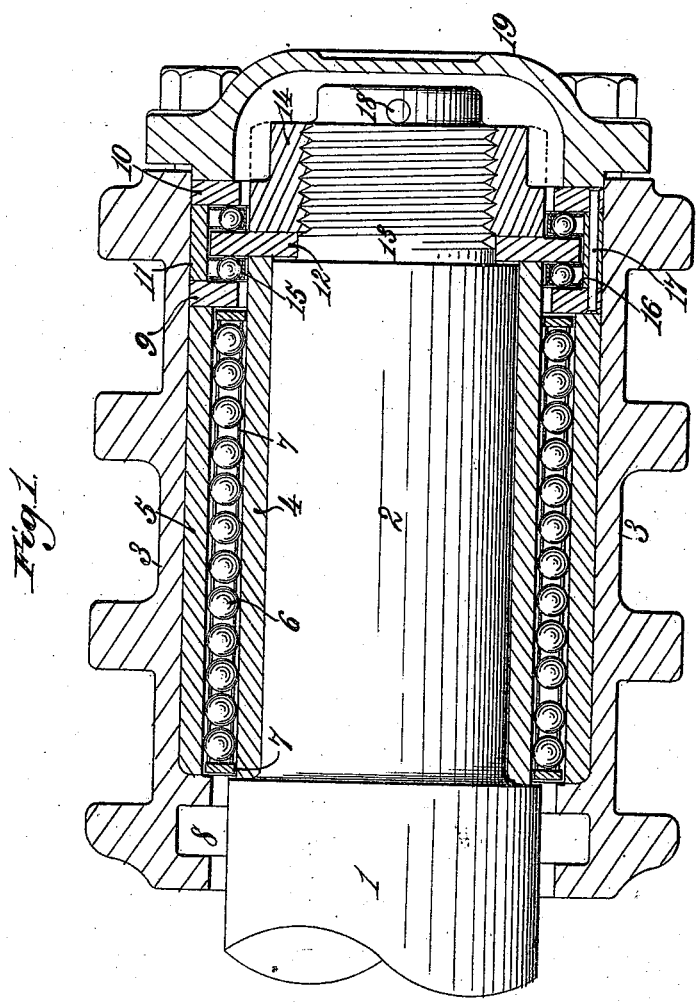
Figure 2:
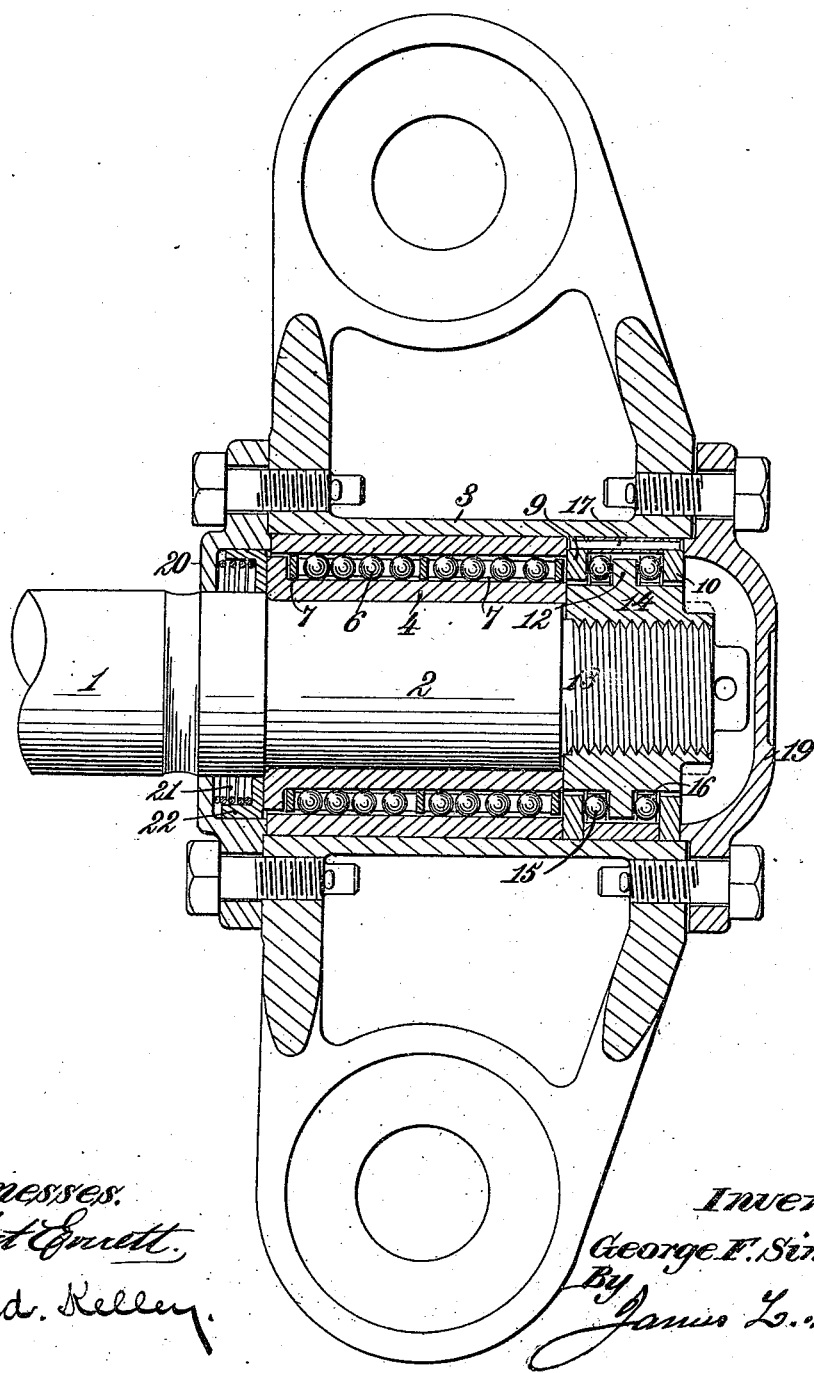
Figure 3:
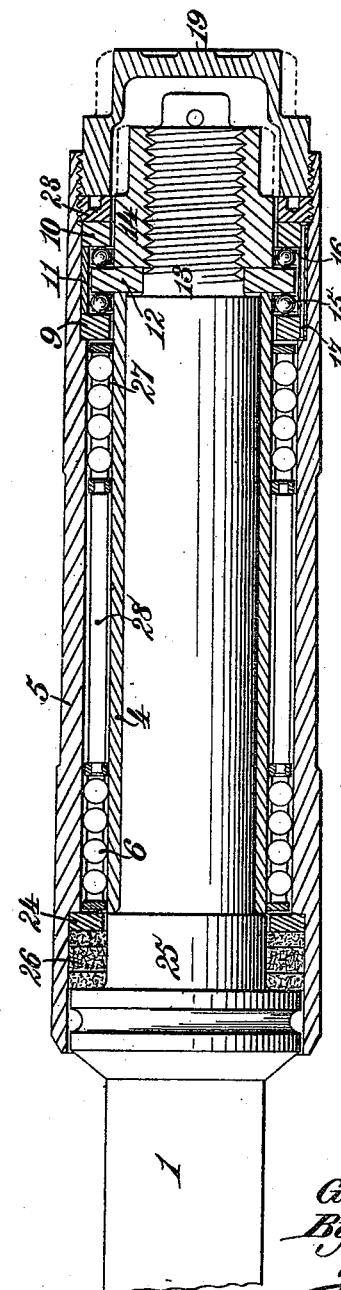
Figure 4:
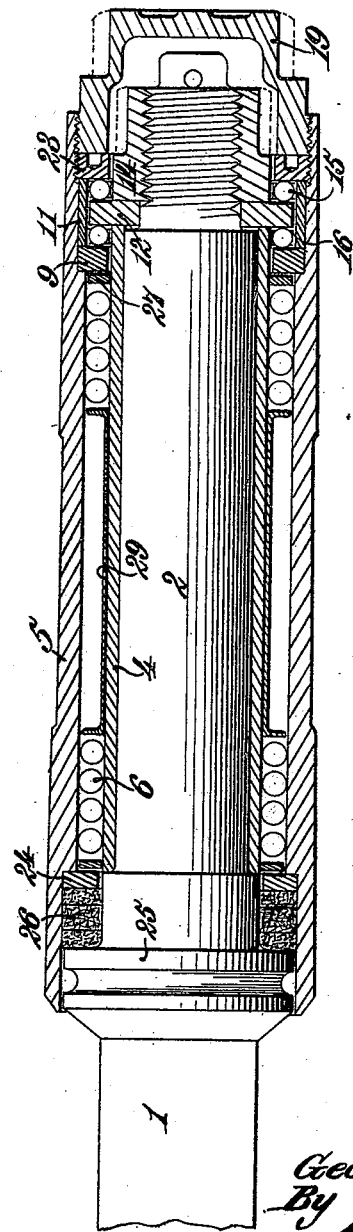

In the annexed drawings illustrating the invention—Figures 1 and 2 are longitudinal sectional views of car axle bearings illustrating my improvements. Figs. 3 and 4 are similar views illustrating the application of my improved ball bearings to axles for carriage wheels.

Referring to the drawings, the numeral 1 designates part of an axle body and 2 an axle spindle.

The numeral 3, Figs. 1 and 2, represents a journal box or housing for a car axle spindle or journal. The axle spindle should be hardened or provided with a sleeve 4 of hardened steel. A similar hardened steel sleeve or tubular boxing 5, but of greater diameter, is to be inserted in the journal box of a car axle or in the hub of a vehicle wheel, as the case may be.

Between the concentric surfaces provided by the axle spindle or its sleeve 4 and the boxing 5 are placed a number of spherical rollers or balls 6 confined in an annular retaining cage 7 that is independent of the concentric bearing surfaces and freely movable between them. As shown in Figs. 1 and 2 this cage 7 may consist of double sets of longitudinally arranged wires connected by suitable rings as described in Letters Patent No. 449,963, granted to me April 7, 1891. The balls 6 are adapted to roll freely in all directions between and in bearing contact with the concentric surfaces 4 and 5 to sustain radial pressure and diminish friction; and are so arranged as to have free lateral play within the retaining cage in such a manner as to move in varying lines on and against the concentric bearing surfaces and thereby distribute the wear with great uniformity.

As shown in Fig. 1 the inner end of the box or housing 3 may be provided with an annular shouldered recess 8 for reception of any suitable packing. In the outer end of the car axle box 3, as shown in Figs. 1 and 2, are placed hardened steel rings 9 and 10 that are spaced apart by a tubular piece 11 of greater internal diameter than said rings. In the car axle bearings shown in Figs. 1 and 2 the inner ring 9 abuts against the outer end of the hardened tubular boxing 5; while in the carriage wheel axle bearing shown in Fig. 3 both rings 9 and 10 and the tubular spacing piece 11 are inserted in the outer end of said tubular boxing. Midway between the rings 9 and 10 is a collar or annular projection 12 which, as shown in Figs. 1 and 3, may be loosely placed on the reduced screw threaded end 13 of the axle spindle or may be formed integral with the retaining nut 14, as shown in Fig. 2. The opposing plane parallel surfaces or sides of the rings 9 and 10 and intermediate collar or annular projection 12 serve as bearing surfaces for separate annular series of spherical rollers or balls 15 confined in ball retaining cages 16 and projecting laterally therefrom in such position as to be capable of revolving freely in all directions and in contact with said parallel plane bearing surfaces, for the purpose of resisting thrust or end pressure. The ball retaining cages 16 may be of any suitable construction, such for instance as described in Letters Patent No. 449,968, granted to me April 7, 1891. The rings 9 and 10 and intermediate tubular spacing piece 11 are preferably connected at intervals by bolts 17 Figs. 1, 2 and 3, so that said rings, spacing piece, collar or annular projection 12 and intermediate cages of thrust resisting balls 15 can be removed in a body when the nut 14 is detached. When in position the nut 14 can be retained or locked by a pin or key 18 passed through a perforation in the end of the axle spindle.

The outer end of the car axle bearing, Figs. 1 and 2, is closed by a sand cap or box 19 that is securely bolted to the journal box or housing 3 and is so arranged as to have a bearing contact for the outer ring 10 and thereby retain in position the several cages of spherical rollers or balls. As shown in Fig. 2 the inner end of the car axle bearing may also be closed by a cap 20 bolted to the box or housing 3 and recessed for reception of a suitable spring packing 21 that may surround the axle. A metal packing ring 22 may also surround the axle within said recessed portion of the inner cap.

In the carriage axle bearing shown in Figs. 3 and 4 the sand box or cap 19 is screwed into the outer internally threaded end of the hub lining or tubular boxing 5 abutting a screw ring 23 that has been previously inserted into the end of said lining or boxing. As shown in Fig. 4 this screw ring 23 may take the place of the ring 10 and thus form one of the bearings for the outer cage of thrust resisting balls. In that case, however, the connecting bolts 17 would be dispensed with. At the inner end of the carriage axle bearing is a metal washer or packing ring 24 and between this and the axle collar 25 is placed a packing 26 of felt, or suitable fibrous material.

In the carriage axle bearings I prefer to place the balls 6 for sustaining radial pressure in a double or two part cage 27 composed of annular end compartments or ball receptacles connected by a series of rods 28 as shown in Fig. 3 or by a tubular shell 29 as shown in Fig. 4. Ball retaining cages of this construction are made the subject of a separate application, Serial No. 452,448, filed by me, of even date herewith. By means of a cage of this character a sufficient number of spherical rollers or balls for sustaining radial pressure or weight can be arranged in the opposite ends of a bearing and retained in operative position without occupying the entire space between the concentric bearing surfaces, and the bearing is lightened and made less expensive without impairing its strength or durability.

It will be observed that an anti-friction ball bearing in which the several parts are constructed and arranged as described will effectually prevent the access of dust, dirt or moisture to its interior.

The parts can be readily and quickly connected or disconnected whenever required, and by reason of its simple and economical construction the cost of the bearing is diminished and its efficiency largely increased.

What I claim as my invention is—

1. In a ball bearing, the combination, with an axle or shaft, the axle boxing, and spherical rollers or balls arranged between the hardened concentric bearing surfaces of the axle and axle boxing, to sustain radial pressure or weight, of parallel rings located at the outer end of the bearing and separated by a tubular spacing piece, a collar or annular projection carried on the axle spindle intermediate said parallel rings, separate annular series of spherical rollers or balls placed between the hardened parallel plane bearing surfaces of said rings and intermediate collar or annular projection to resist thrust or end pressure, and cages in which said balls are confined, substantially as described.

2. In a ball bearing, the combination of two parallel rings, a tubular spacing piece intermediate the outer portions of said rings, bolts that connect said rings and tubular spacing piece, a collar located intermediate said rings and adapted to be attached to a shaft or axle, and separate annular series of spherical rollers or balls confined in annular cages placed between said rings and collar, the said rollers projecting laterally from the cages in position to roll on and against the hardened parallel plane bearing surfaces of the two rings and intermediate collar to resist thrust or end pressure, substantially as described.

3. In a ball bearing, the combination with an axle or shaft, the axle boxing an annular ball-retaining cage located between the hardened concentric bearing surfaces of the axle and axle boxing and independent thereof, and spherical rollers or balls confined in said cage and projecting therefrom in position to roll in all directions on said concentric bearing surfaces for the purpose of sustaining radial pressure or weight, of two parallel rings located at the outer end of the bearing, a tubular spacing piece intermediate the outer portions of said rings, a collar or annular projection carried on the axle intermediate the inner portions of said parallel rings, separate annular cages placed between said rings and collar and containing spherical rollers or balls projecting laterally therefrom in position to roll in all directions on the hardened plane bearing surfaces of said parallel rings and intermediate collar to resist thrust or end pressure in both directions, a nut on the end of the axle spindle, a sand cap at the outer end of the bearing and a packing at the inner end of the bearing, substantially as described.

In testimony whereof I have hereunto set my hand in presence of two subscribing witnesses.

GEORGE F. SIMONDS.

Witnesses:
A. R. BROWN,
GEO. W. REA.